(12) United States Patent
Mercier (10) Patent No.: US 9,760,809 B2
(45) Date of Patent: Sep. 12, 2017

(54) SYSTEMS AND METHODS FOR MULTI-FACTOR IMAGE RECOGNITION

(71) Applicant: BAE Systems Information And Electronic Systems Integration Inc., Nashua, NH (US)

(72) Inventor: Michael N. Mercier, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 190 days.

(21) Appl. No.: 14/887,863

(22) Filed: Oct. 20, 2015

(65) Prior Publication Data

US 2016/0140426 A1     May 19, 2016

Related U.S. Application Data

(60) Provisional application No. 62/066,151, filed on Oct. 20, 2014.

(51) Int. Cl.
| G06K 9/32 | (2006.01) |
| G06K 9/72 | (2006.01) |
| G06F 17/30 | (2006.01) |

(52) U.S. Cl.
CPC ......... *G06K 9/72* (2013.01); *G06F 17/30265* (2013.01)

(58) Field of Classification Search
None
See application file for complete search history.

(56) References Cited

U.S. PATENT DOCUMENTS

| | | | | |
|---|---|---|---|---|
| 6,347,323 | B1* | 2/2002 | Garber | G06F 17/211 |
| 7,031,496 | B2* | 4/2006 | Shimano | G06K 9/6293 |
| | | | | 382/104 |
| 2002/0044691 | A1* | 4/2002 | Matsugu | G06K 9/20 |
| | | | | 382/218 |
| 2004/0118920 | A1* | 6/2004 | He | G06K 7/0004 |
| | | | | 235/454 |
| 2006/0088207 | A1* | 4/2006 | Schneiderman | G06K 9/00241 |
| | | | | 382/159 |
| 2008/0212899 | A1* | 9/2008 | Gokturk | G06F 17/30259 |
| | | | | 382/305 |
| 2010/0332475 | A1* | 12/2010 | Birdwell | G06F 17/30333 |
| | | | | 707/737 |
| 2012/0128250 | A1* | 5/2012 | Petrou | G06F 17/30253 |
| | | | | 382/182 |
| 2013/0054603 | A1* | 2/2013 | Birdwell | G06K 9/6224 |
| | | | | 707/738 |
| 2014/0210800 | A1* | 7/2014 | Takimoto | G06F 17/30265 |
| | | | | 345/204 |
| 2017/0032186 | A1* | 2/2017 | Murata | G06F 17/30 |
| 2017/0091537 | A1* | 3/2017 | Wnuk | G06K 9/00342 |

* cited by examiner

*Primary Examiner* — Iman K Kholdebarin
(74) *Attorney, Agent, or Firm* — McCarter & English LLP (57) ABSTRACT

A mechanism for image recognition based on multiple factors is described. A method, system and computer-readable medium for multi-factor image recognition includes using environmental contextual attributes to create likelihood tiers in an image recognition database such that irrelevant entries are excluded from the search. The mechanism described here limits and sorts by contextual likelihood the number of entries to be searched, increasing both the speed and accuracy of the image recognition process.

20 Claims, 5 Drawing Sheets

SYSTEMS AND METHODS FOR MULTI-FACTOR IMAGE RECOGNITION

RELATED APPLICATIONS

This application claims benefit of and priority to U.S. Provisional Patent Application Ser. No. 62/066,151, filed Oct. 20, 2014, which is incorporated herein by reference in its entirety.

BACKGROUND

One important role played by observation systems is image recognition. Such systems recognize targets, incoming threats, ground features, objects, wildlife, and various other observable phenomena captured by optical sensors of all kinds. Properly recognizing the identity of observed objects is therefore an important function of observation systems.

SUMMARY

In one embodiment a method for multi-factor image recognition includes categorizing images in a database based on one or more environmental contextual attributes. The method also identifies one or more environmental contextual attributes associated with an object in an observed image and creates multiple likelihood tiers from the categorized images in the database based on the presence or absence of the one or more identified environmental contextual attributes. Image recognition is performed for the object using images in a first likelihood tier having the greatest number of the one or more environmental contextual attributes among the likelihood tiers.

In another embodiment, a system for performing multi-factor image recognition includes a memory and one or more processors in communication with the memory. The one or more processors are configured to categorize images in a database based on one or more environmental contextual attributes and identify one or more environmental contextual attributes associated with an object in an observed image. The one or more processors are further configured to create multiple likelihood tiers from the categorized images in the database based on the presence or absence of the one or more environmental contextual attributes. Image recognition is performed for the object using images in a first likelihood tier having the greatest number of the one or more environmental contextual attributes among the likelihood tiers.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Conventional observation systems lack the lifetime of experience and adaptability that humans draw on to identify images. Known methods rely on massive databases to associate edge and shape data with particular observable phenomena. These databases require substantial time to search, and consume large amounts of valuable processing resources. Additionally, because these databases often rely entirely on shape and edge data, and occasionally color or spectral data, rather than the multiple factors evaluated by the human mind, many images may be unnecessarily identified as potential matches by the system and further analyzed in greater detail. This further slows the recognition process and results in reduced accuracy of identification.

Figure 1:
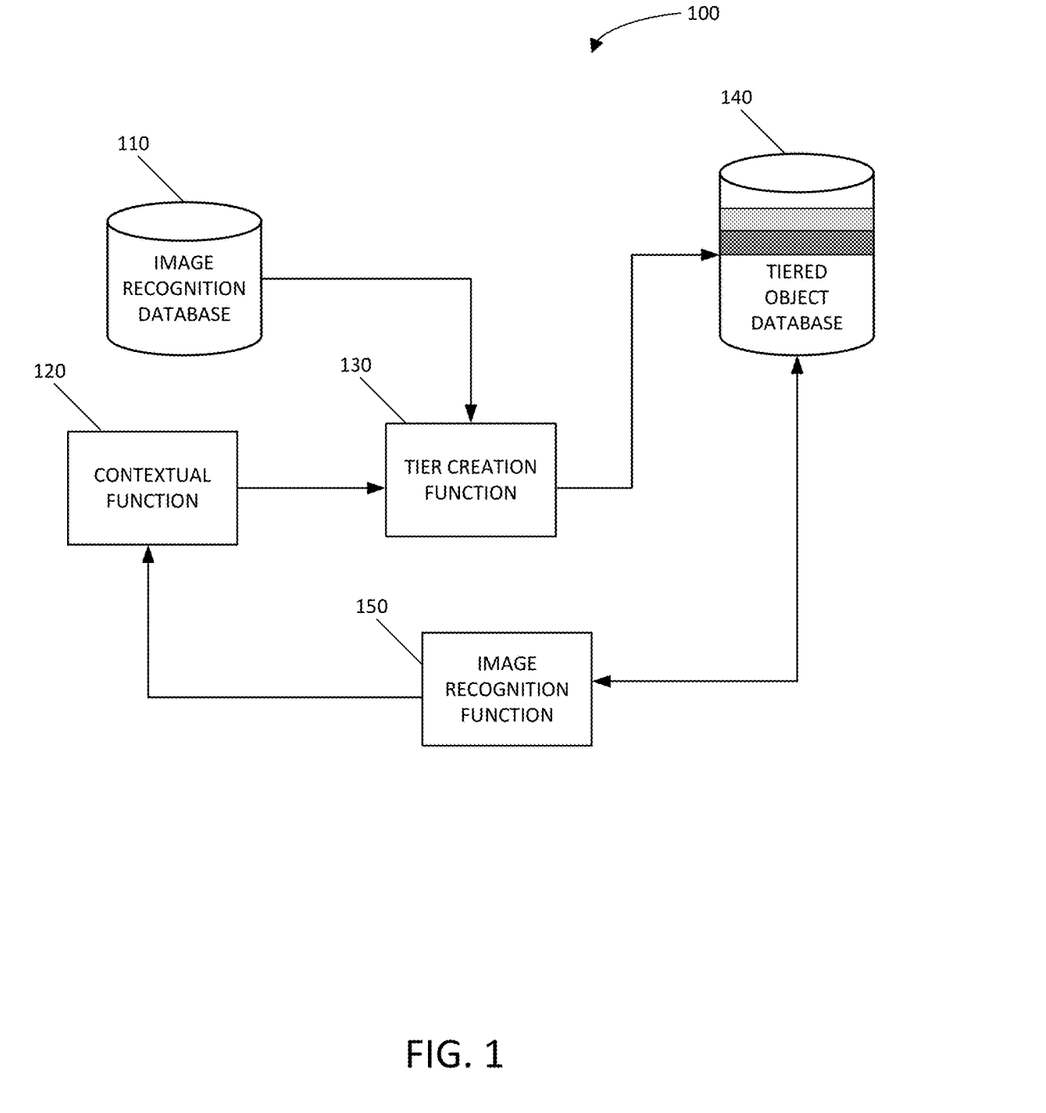
FIG. 1 depicts a system for multi-factor image recognition, according to an example embodiment.

Embodiments of the present invention use environmental contextual cues from the image environment in which an object appears to perform image recognition. Using environmental context to prioritize an image recognition database substantially reduces the number of potential objects to be searched. Image entries in the image recognition database that are likely to be irrelevant are excluded from the search until more likely matches or scenarios have been investigated. The reduced set of images can be rapidly searched to determine a match for an observed object. Further, in one embodiment, spectral image properties may also be incorporated into an image recognition database to more precisely define potentially observable phenomena. Spectral, or color-palate, properties are used to differentiate similarly-shaped images or to help identify those images where no clearly defined outline is available. Thus, adding these properties to the image recognition database provides important clues about the identity of observed phenomena and adds additional, time-saving limitations on the number of potential matching images FIG. 1 depicts a system 100 for multi-factor image recognition, according to an example embodiment. The system 100 includes an image recognition database 110, a contextual function 120, a tier creation function 130, a tiered object database 140, and an image recognition function 150.

The image recognition database 110 may store data related to various images to aid in recognition and categorization of phenomena and objects observed or perceived by an imaging device or sensor, such as but not limited to, a camera. The image recognition database 110 may store data related to thousands to millions of images of objects.

The contextual function 120 may categorize the images in the image recognition database by identifying environmental contextual attributes for the images in the image database. The environmental contextual attributes of the images may include but are not limited to: landscape features, geographic location, time of day, time of year, date, and proximity to other recognized objects. For example, an image may be automatically or manually identified as having a location (e.g., outdoors), a time of day (e.g., at night), and a time of year (e.g., in December).

This pre-categorization of the image environment greatly simplifies object recognition as described further below. The contextual function 120 may include various circuits, circuitry and one or more software components, programs, applications, apps or other units of code base or instructions configured to be executed by one or more processors 512, 512' included in computing device 510 described in relation to FIG. 5. As discussed further below, the contextual function 120 may also be configured to receive as input identified environmental context attributes for an object in an observed image for which identification is desired. This input may be based on a programmatic analysis of the observed image or situation or may be manually input by a user. The identified environmental contextual attributes for the observed image are provided by the contextual function 120 to the tier creation function 130.

The tier creation function 130 is in communication with the image recognition database 110. The tier creation function 130 may be configured to analyze the data stored in the image recognition database 110 in view of the identified contextual attributes provided by the contextual function 120. The tier creation function 130 may identify images from the data in the image recognition database 110 that relate to the identified contextual attributes, and organize the tiered object database 140. The tier creation function 130 may include various circuits, circuitry and one or more software components, programs, applications, apps or other units of code base or instructions configured to be executed by one or more processors 512, 512' included in computing device 510 described in relation to FIG. 5.

The tiered object database 140 stores data related to images of various phenomena and objects. In some embodiments, the tiered object database 140 stores the same data as the image recognition database 110 and in addition stores information indicating one or more environmental contextual attributes for each image. The tier creation function 130 is configured to create tiers in the tiered object database 140 based on the identified environmental contextual attributes of the object in the observed image. In one embodiment, the data may include likelihood tiers where each successive tier represents a decreasing likelihood that the object is present or relates to the current contextual situation observed by the imaging device.

The image recognition function 150 is configured to search some of the tiers of the tiered object database 140 to identify one or more objects in the image observed or perceived by the imaging device. The image recognition function 150 may include various circuits, circuitry and one or more software components, programs, applications, apps or other units of code base or instructions configured to be executed by one or more processors 512, 512' included in computing device 510 described in relation to FIG. 5. For example, the image recognition function may search images within the tiers using conventional techniques analyzing shape, edge, and spectral data to identify a match to the observed object. In one embodiment, the identified objects and the environmental contextual attributes related to the objects identified by the image recognition function 150 are provided to the contextual function 120, so that the contextual function 120 may update a list of relevant environmental contextual attributes.

The multi-factor image recognition system 100 thus uses contextual cues to sort an image recognition database. Using environmental context to prioritize an image recognition database substantially reduces the number of potential images to be searched. For example, in the Sahara Desert, it is unlikely that an imaging device would detect a ship and therefore restricting an image search to objects found in a desert location will initially exclude a ship from the universe of possible objects when seeking to correctly identify an object in such a location. The image recognition system of the present invention only searches one or a few small tiers of the database, rather than the entire database, to identify the object. Thus unnecessary entries are excluded from the search until more likely scenarios have been ruled out, conserving time and processing resources. In one embodiment, the effectiveness of the tier creation function is improved by updating each likelihood tier with images previously recognized in a given environmental context.

Figure 2:
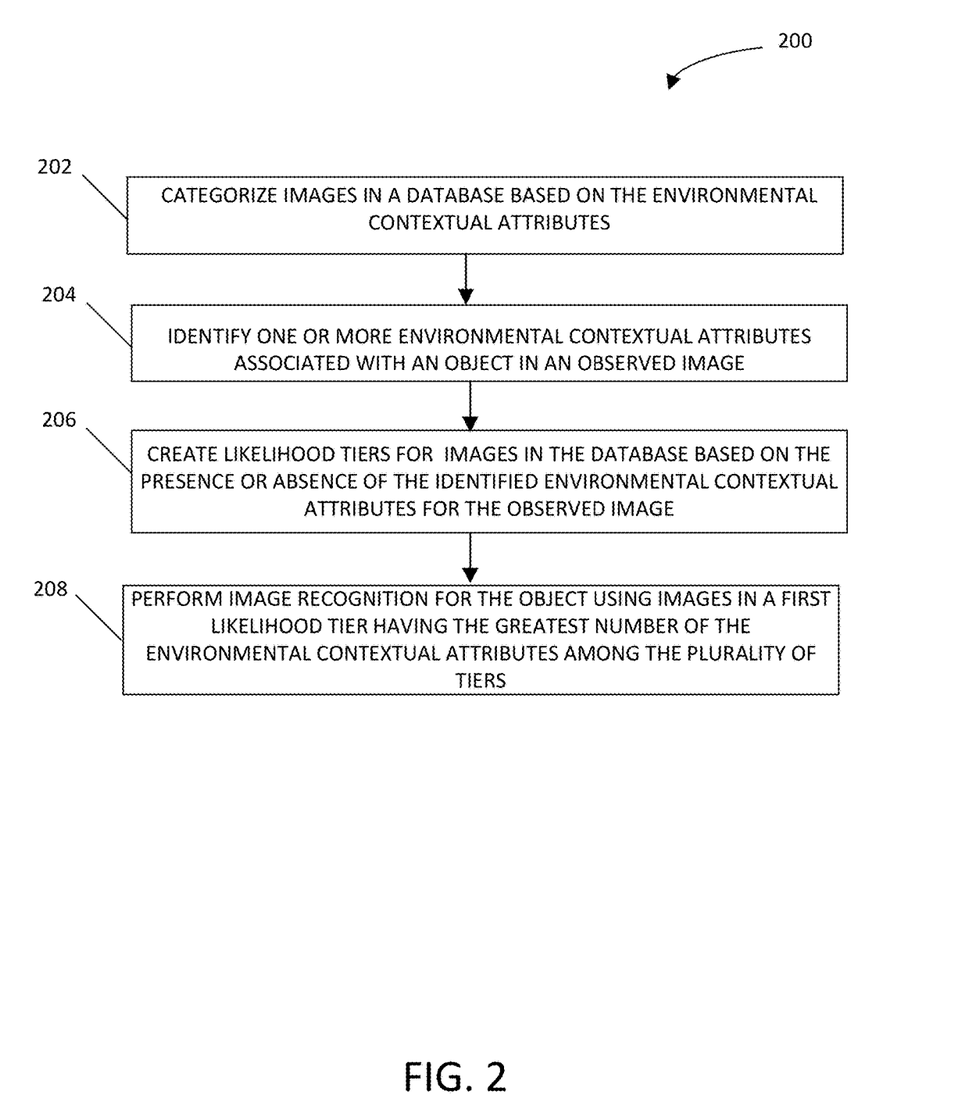
FIG. 2 is a flow chart illustrating a method for multi-factor image recognition, according to an example embodiment.

FIG. 2 is a flow chart illustrating an example method 200 for multi-factor image recognition, according to an example embodiment. The method 200 may be performed using one or more components of system 100 described above.

At step 202, the system 100 categorizes images in a database (e.g., the image recognition database 110) based on the environmental contextual attributes. At step 204, the system 100 identifies one or more environmental contextual attributes associated with an object in an observed image. At step 206, the system 100 creates tiers among the images in the database based on the presence or absence of the identified environmental contextual attributes to create multiple likelihood tiers. At step 208, the system 100 performs image recognition for the object using images in a first likelihood tier having the greatest number of the identified environmental contextual attributes. In an example embodiment, the method 200 further includes identifying an image matching the object from the images in the first likelihood tier. In another example embodiment, the method 200 includes identifying no matches to the object from the images in the first likelihood tier, and in response, performing image recognition for the object using images in a second likelihood tier, where the second likelihood tier has the next greatest number of the identified environmental contextual attributes. If an image match is not found in the second likelihood tier, then the method 200 continues to perform image recognition in the next likelihood tiers until an image match is found.

Figure 3:
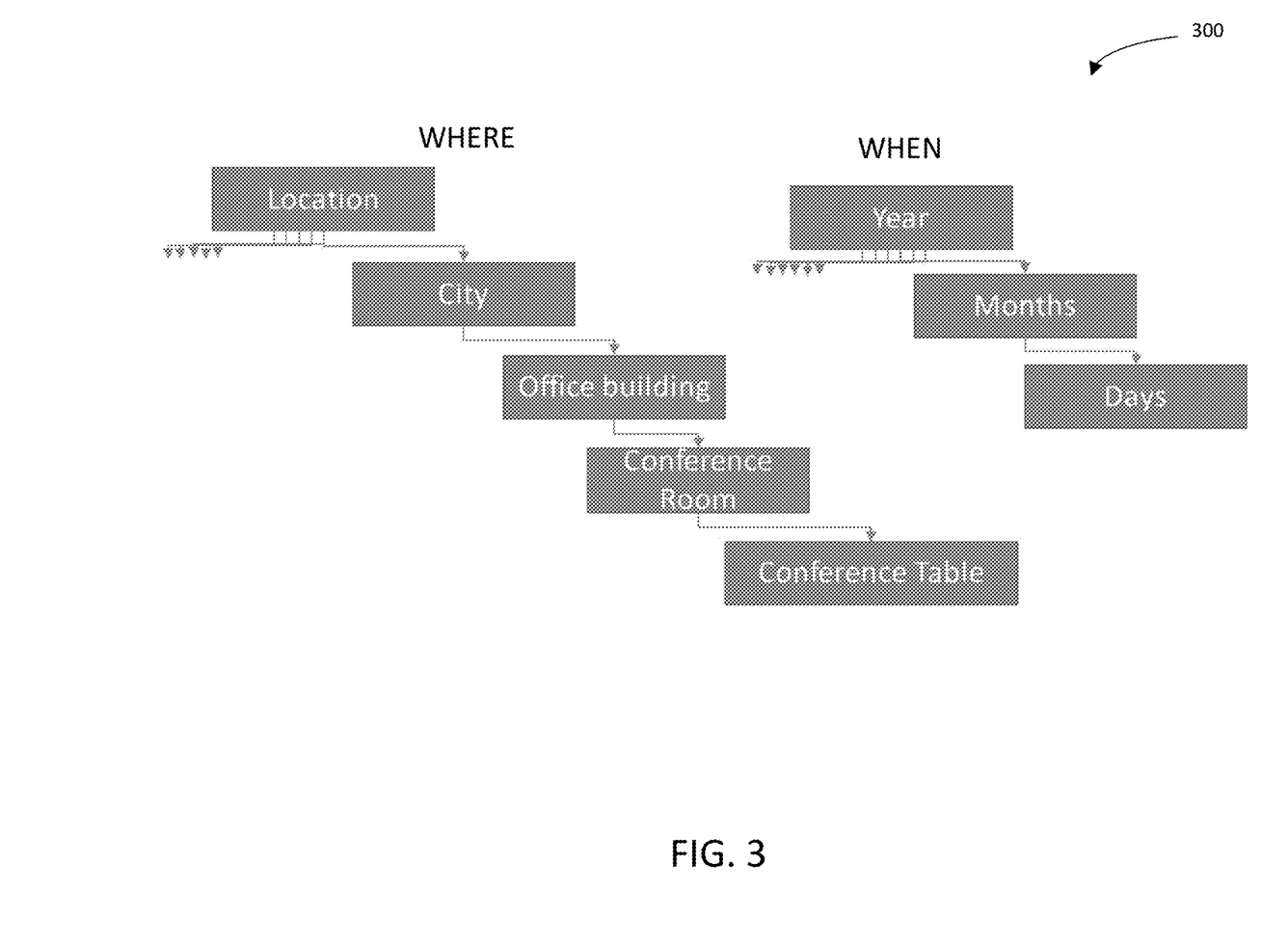
FIG. 3 illustrates likelihood tiers created by the multi-factor image recognition system, according to an example embodiment.

FIG. 3 illustrates example likelihood tiers 300 created by the multi-factor image recognition system, according to an example embodiment. As illustrated in FIG. 3, the likelihood tiers 300 may be created based on environmental contextual attributes that indicate 'where' an object may exist, and based on environmental contextual attributes that indicate 'when' an object may exist. As shown in the FIG. 3, the 'where' likelihood tiers can include Location, City, Office Building, Conference Room, and Conference Table. The 'when' likelihood tiers can include Year, Months, and Days. In an example embodiment, the system 100 may search the images in a 'where' likelihood tier and a 'when' likelihood tier in parallel to recognize the object in the observed image. As described above, if a match is not found in one likelihood tier, then the next likelihood tier is searched. As a non-limiting example, the system 100 may be configured to realize that it is more likely that a holiday decoration is observed in an image in December rather than in July on a conference table. As another non-limiting example, the system 100 may be configured to realize that it is more likely to see Red Sox merchandise in Boston than in New York. As yet another non-limiting example, the system 100 may be configured to realize that it is less likely to see an office chair 'on' a conference table (lowest likelihood tier), but that it is likely to see an office chair in a conference room (the next likelihood tier).

In some embodiments, the method 200 includes receiving a spectral profile indicating spectral or color-palate properties of an image. The method further includes associating at least one spectral profile with at least one image in the database, and comparing at least one spectral observation with the at least one spectral profile. In another embodiment, the method 200 includes associating at least one spectral profile with at least one image in the database, and generating at least one contextual attribute for at least one image in the database based on the at least one spectral profile. In some embodiments, the method 200 includes receiving input indicating the at least one contextual attribute.

Figure 4:
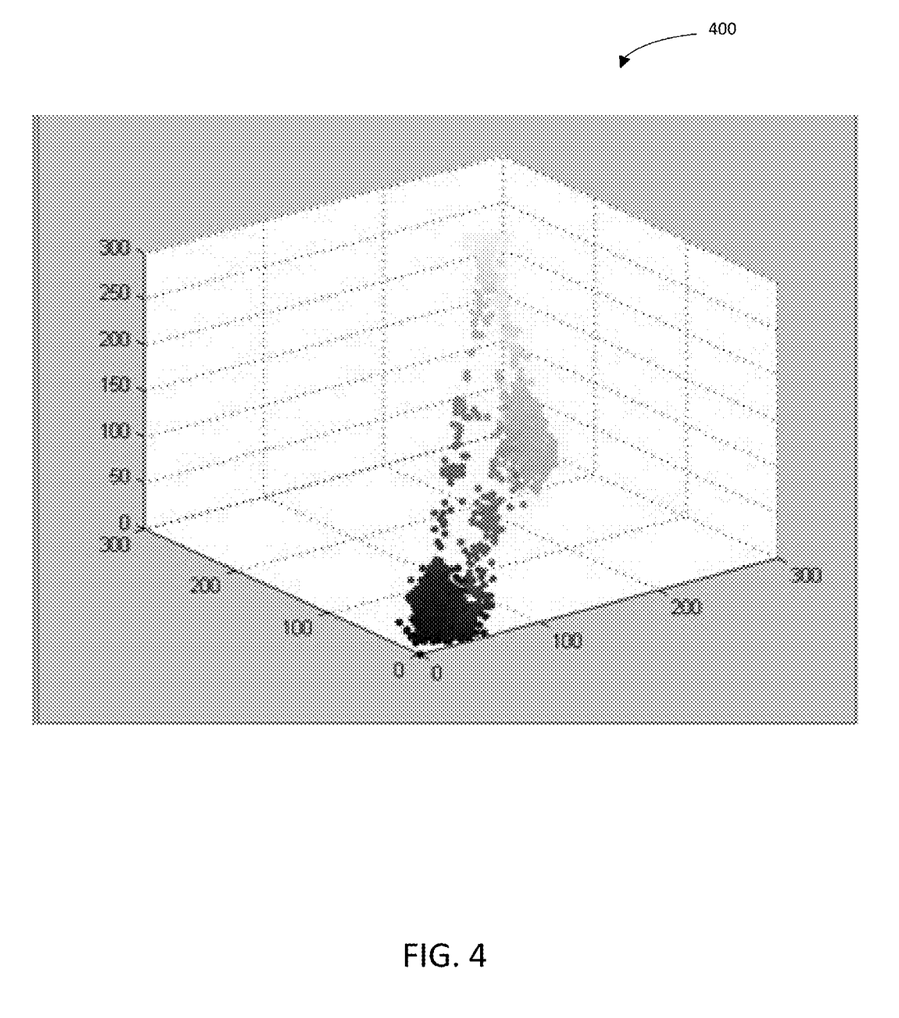
FIG. 4 is a graph of a spectral analysis histogram, according to an example embodiment.

FIG. 4 is a graph 400 of a spectral analysis histogram, according to an example embodiment. The graph 400 shows an exemplary embodiment of spectral image data to be incorporated into an image recognition database to more precisely define potentially observable phenomena. Spectral, or color-palate, properties provide additional data inputs associated with entries in the image database. Providing additional associated features for each entry enables the image recognition system to differentiate similarly-shaped objects or identify images when no clearly defined outline is available and shape-based identification is impossible. Including these important clues about the identity of observed phenomena substantially increases the accuracy and identification success rate, as well as limiting the number of potential matches identified by the image recognition system.

Combining spectral image data with situational context combines the benefits of both, but also increases quality of the contextual tier creation because spectral data provides additional contextual cues with which to categorize and sort images in the image recognition database. These additional cues provide more robust likelihood tiers and further improve the accuracy and speed of image recognition.

Figure 5:
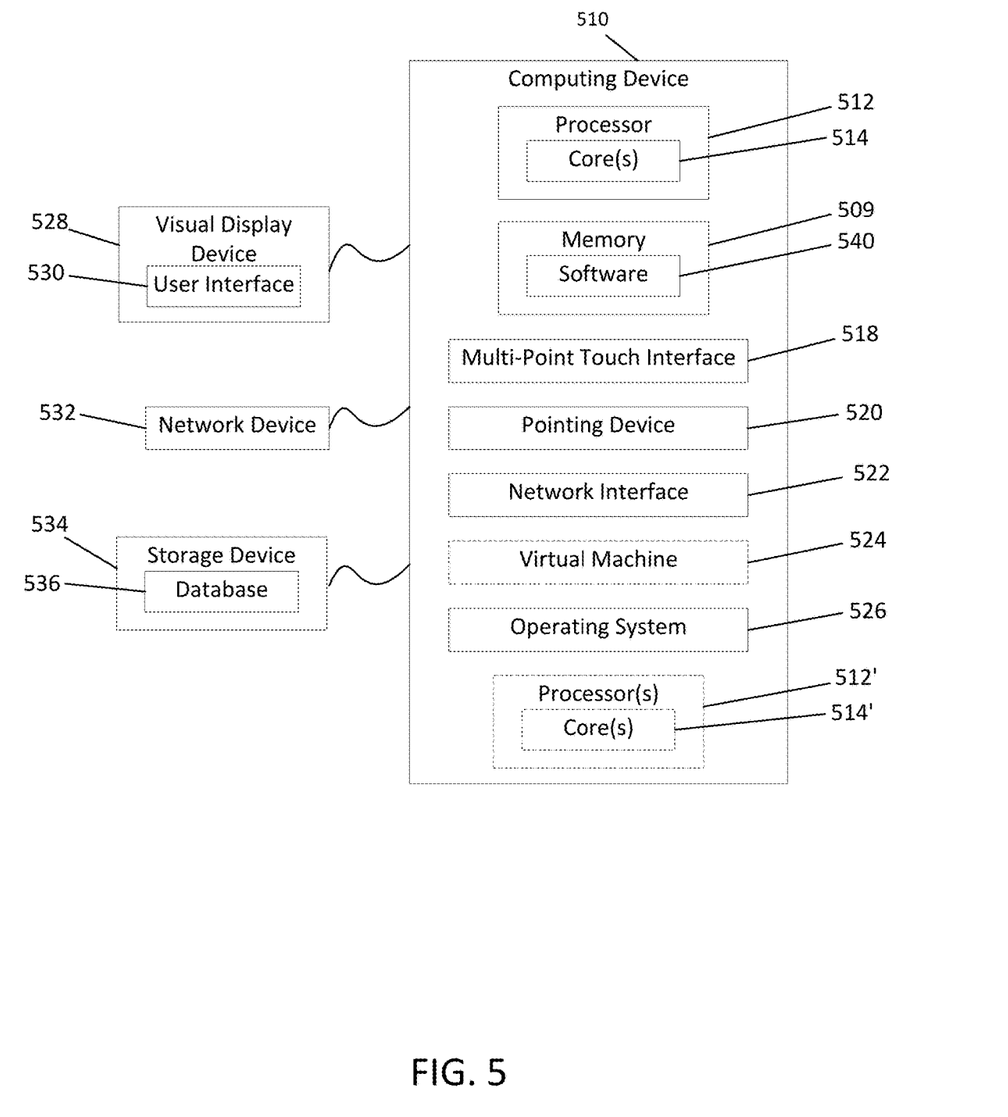
FIG. 5 is a block diagram of an exemplary computing device that may be used to implement exemplary embodiments of multi-factor image recognition system described herein.

FIG. 5 is a block diagram of an exemplary computing device 510 such as can be used, or portions thereof, in accordance with various embodiments and, for clarity, refers back to and provides greater detail regarding various elements of the system 100 of FIG. 1. The computing device 510 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 509 included in the computing device 510 can store computer-readable and computer-executable instructions or software for performing the operations disclosed herein. For example, the memory 509 can store a software application 540 which is configured to perform various of the disclosed operations (e.g., categorizing an image in the database based on a contextual attribute and sorting the database based on the contextual categories). The computing device 510 can also include configurable and/or programmable processor 512 and an associated core 514, and optionally, one or more additional configurable and/or programmable processing devices, e.g., processor(s) 512' and associated core(s) 514' (for example, in the case of computational devices having multiple processors/cores), for executing computer-readable and computer-executable instructions or software stored in the memory 509 and other programs for controlling system hardware. Processor 512 and processor(s) 512' can each be a single core processor or multiple core (514 and 514') processor. In some embodiments, processor 512 and processor(s) 512' can each be one or more of a field-programmable gate array (FPGA), a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 510 so that infrastructure and resources in the computing device can be shared dynamically. A virtual machine 524 can be provided to handle a process running on multiple processors so that the process appears to be using only one computing resource rather than multiple computing resources. Multiple virtual machines can also be used with one processor.

Memory 509 can include a computational device memory or random access memory, such as DRAM, SRAM, EDO RAM, and the like. Memory 509 can also include, for example, flip-flops, memory blocks, RAM blocks, programmable read-only memory, and the like. Memory 409 can include other types of memory as well or combinations thereof.

A user can interact with the computing device 510 through a visual display device 528, such as a computer monitor, which can display one or more user interfaces 530 that can be provided in accordance with exemplary embodiments. The computing device 510 can include other I/O devices for receiving input from a user, for example, a keyboard or any suitable multi-point touch interface 518, or a pointing device 520 (e.g., a mouse). The keyboard 518 and the pointing device 520 can be coupled to the visual display device 528. The computing device 510 can include other suitable conventional I/O peripherals.

The computing device 510 can also include one or more storage devices 534, such as a hard-drive, CD-ROM, or other computer readable media, for storing data and computer-readable instructions and/or software that perform operations disclosed herein. Exemplary storage device 534 can also store one or more databases 536 (e.g., image recognition database 110 and/or sorted object database 140) for storing any suitable information required to implement exemplary embodiments. The databases 536 can be updated manually or automatically at any suitable time to add, delete, and/or update one or more items in the databases.

The computing device 510 can include a network interface 522 configured to interface via one or more network devices 532 with one or more networks, for example, Local Area Network (LAN), Wide Area Network (WAN) or the Internet through a variety of connections including, but not limited to, standard telephone lines, LAN or WAN links (for example, 802.11, T1, T6, 56kb, X.25), broadband connections (for example, ISDN, Frame Relay, ATM), wireless connections, controller area network (CAN), or some combination of any or all of the above. The network interface 522 can include a built-in network adapter, network interface card, PCMCIA network card, card bus network adapter, wireless network adapter, USB network adapter, modem or any other device suitable for interfacing the computing device 510 to any type of network capable of communication and performing the operations described herein. Moreover, the computing device 510 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 510 can run any operating system 526, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 526 can be run in native mode or emulated mode. In an exemplary embodiment, the operating system 526 can be run on one or more cloud machine instances.

The above description has been presented to enable a person skilled in the art to create and use a computer system configuration and related method and article of manufacture to recognize images based on multiple contextual attributes. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for performing multi-factor image recognition comprising:
    categorizing images in a database based on one or more environmental contextual attributes of the images;
    identifying one or more environmental contextual attributes associated with an object in an observed image;
    creating a plurality of likelihood tiers from the categorized images in the database based on the presence or absence of the one or more identified environmental contextual attributes; and
    performing image recognition for the object using images in a first likelihood tier having the greatest number of the one or more environmental contextual attributes among the plurality of likelihood tiers.

2. The method of claim 1, further comprising:
    identifying an image that matches the object from the first likelihood tier.

3. The method of claim 1, further comprising:
    in response to identifying no matches for the object among the images in the first likelihood tier, performing image recognition for the object using images in a second likelihood tier having the next greatest number of the one or more environmental contextual attributes; and
    identifying an image that matches the object from the second likelihood tier.

4. The method of claim 1, further comprising:
    receiving a spectral profile indicating spectral or color-palate properties of an image.

5. The method of claim 4, further comprising:
    associating at least one spectral profile with at least one image in the database; and
    comparing at least one spectral observation with the at least one spectral profile.

6. The method of claim 4, further comprising:
    associating at least one spectral profile with at least one image in the database; and
    generating at least one contextual attribute for said the at least one image based on the at least one spectral profile.

7. A system for performing multi-factor image recognition comprising:
    a memory; and
    one or more processors in communication with the memory, the one or more processors configured to:
        categorize images in a database based on one or more environmental contextual attributes;
        identify one or more environmental contextual attributes associated with an object in an observed image;
        create a plurality of likelihood tiers from the categorized images in the database based on the presence or absence of the one or more identified environmental contextual attributes; and
        perform image recognition for the object using images in a first likelihood tier having the greatest number of the one or more environmental contextual attributes among the plurality of likelihood tiers.

8. The system of claim 7, wherein the one or more processors is a field-programmable gate array.

9. The system of claim 7, wherein the one or more processors is a microprocessor.

10. The system of claim 7, wherein the one or more processors are further configured to:
    receive a spectral profile indicating spectral or color-palate properties of an image.

11. The system of claim 10, wherein the one or more processors are further configured to:
    associate at least one spectral profile with at least one image in the database; and
    compare at least one spectral observation with the at least one spectral profile.

12. The system of claim 10, wherein the one or more processors are further configured to:
    associate at least one spectral profile with at least one image in the database; and
    generate at least one contextual attribute for the at least one image in the database based on the at least one spectral profile.

13. The system of claim 7 wherein the one or more processors are further configured to:

identify an image that matches the object from the first likelihood tier.

14. The system of claim 7 wherein the one or more processors are further configured to:
in response to identifying no matches for the object among the images in the first likelihood tier, perform image recognition for the object using images in a second likelihood tier having the next greatest number of the one or more environmental contextual attributes; and
identify an image that matches the object from the second likelihood tier.

15. A non-transitory computer readable medium storing instructions executable by a processing device, the instructions implementing a method for performing multi-factor image recognition, execution of the instructions causes the processing device to:
identify one or more environmental contextual attributes associated with an object in an observed image;
categorize images in a database based on the one or more environmental contextual attributes;
create a plurality of likelihood tiers from the categorized images in the database based on the presence or absence of the one or more identified environmental contextual attributes; and
perform image recognition for the object using images in a first likelihood tier having the greatest number of the one or more environmental contextual attributes among the plurality of likelihood tiers.

16. The medium of claim 15, wherein execution of the instructions further causes the processing device to:
identify an image that matches the object from the first likelihood tier.

17. The medium of claim 15, wherein execution of the instructions further causes the processing device to:
in response to identifying no matches for the object among the images in the first likelihood tier, perform image recognition for the object using images in a second likelihood tier having the next greatest number of the one or more environmental contextual attributes; and
identify an image that matches the object from the second likelihood tier.

18. The medium of claim 15, wherein execution of the instructions further causes the processing device to:
receive a spectral profile indicating spectral or color-palate properties of an image.

19. The medium of claim 18, wherein execution of the instructions further causes the processing device to:
associate at least one spectral profile with at least one image in the database; and
compare at least one spectral observation with the at least one spectral profile.

20. The medium of claim 18, wherein execution of the instructions further causes the processing device to:
associate at least one spectral profile with at least one image in the database; and
generate at least one contextual attribute for said the at least one image based on the at least one spectral profile.

* * * * *